United States Patent Office 2,986,413
Patented May 30, 1961

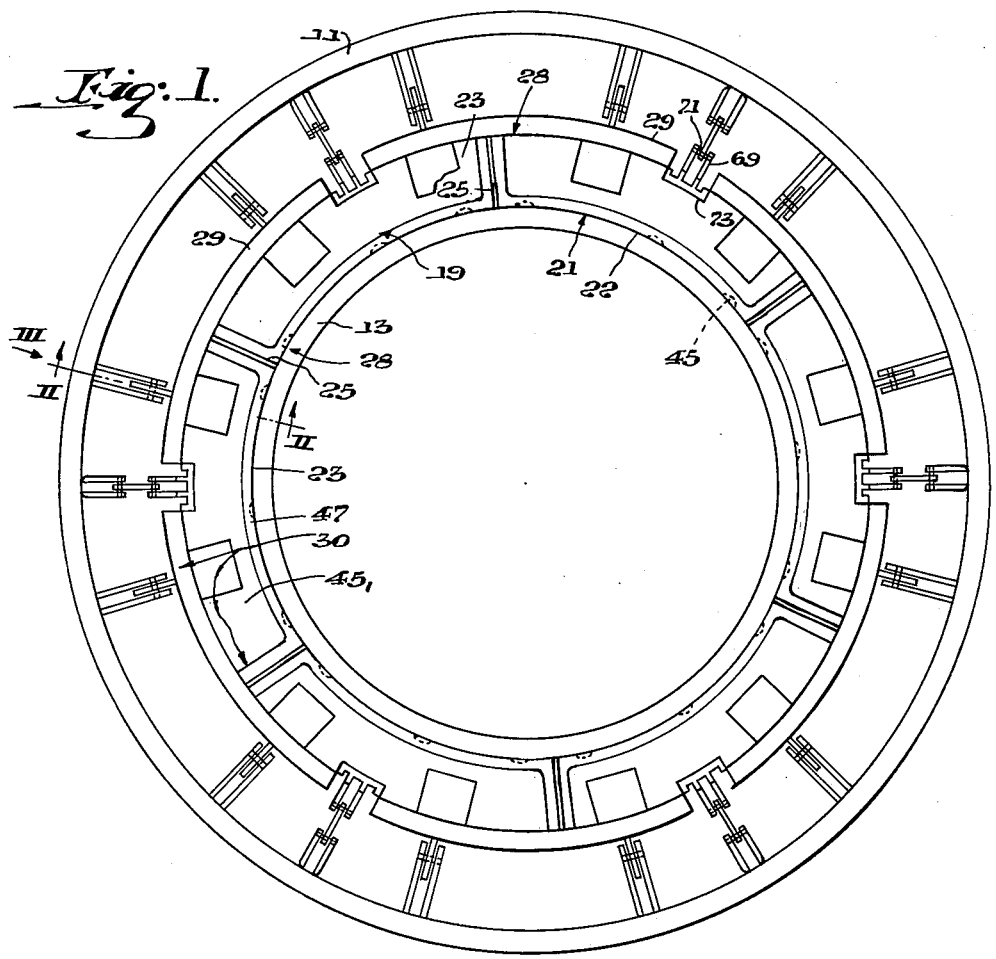

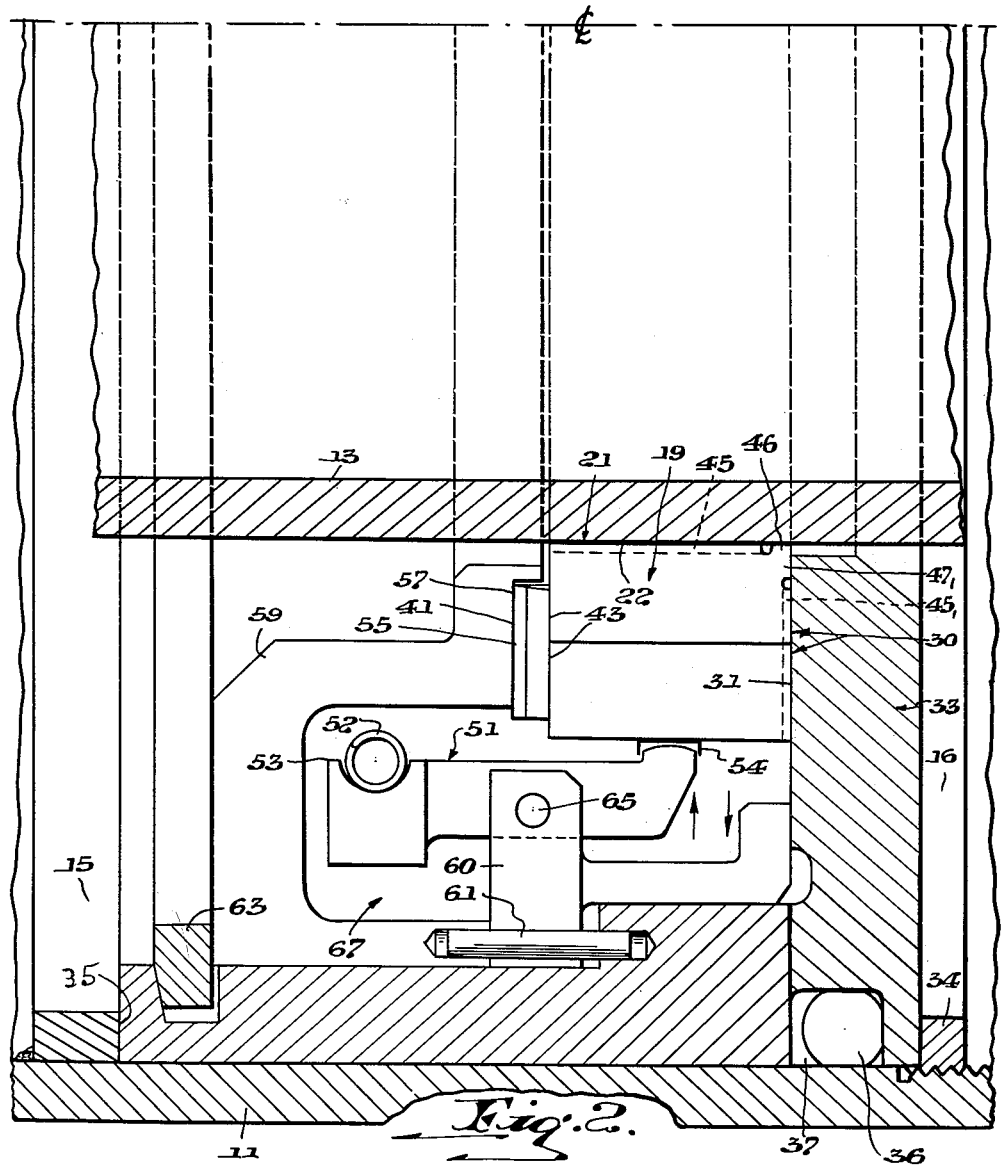

2,986,413
SHAFT SEAL
Ernest J. Taschenberg, Baltimore, Md., assignor to Koppers Company, Inc., a corporation of Delaware
Filed Aug. 12, 1959, Ser. No. 833,342
4 Claims. (Cl. 286—11.11)

This invention relates generally to shaft seals and more particularly to annular circumferential shaft seals which are adapted to rotate about the axis of the shaft.

Heretofore, simple piston rings were used to block the flow of fluid such as air and oil between two members as, for example, in the space between the two coaxial rotatable shafts of "twin spool" jet engines. These seals have heretofore comprised an annular piston ring seal that is contained within a groove on the inner rotating shaft and which expands radially outward to contact and to rotate with the outer shaft. Since the contact force between the piston ring seal and the outer shaft is directly proportional to the angular velocity of the rotating outer shaft, this presented a problem because, as the seal rotated, increasing centrifugal force tended to hold the seal in contact with the outer shaft such that any force required to move the seal axially became excessive. Increasing the force required to move the seal axially during any axial movement of the coaxial rotating shafts relative to each other, of course, increased wear on the sealing surfaces of the piston ring seal to such an extent that the seal became incapable of preventing leakage and had an insufficient operative life.

By this invention, therefore, it is contemplated to provide a circumferential shaft seal with means for holding the seal in sealing contact with coaxially rotating shafts which overcomes the aforesaid disadvantage of previously used piston ring seals.

This invention contemplates an annular seal mounted for rotation with the first of first and second coaxially rotatable members and adapted for contacting the second member and for filling the space between said members, and including a provision on said seal for counteracting the action of the centrifugal force on said seal caused by rotation of the first member.

The above and further novel features of the invention will appear more fully from the following detailed description when the same is read in connection with the accompanying drawings. It is to be expressly understood, however, that the drawings are not intended as a definition of the invention but are for the purpose of illustration only.

Fig. 1 is a partial side view of an embodiment of this invention.

Fig. 2 is a partial cross section of Fig. 1 through II—II.

Fig. 3 is a partial top view of elements of Fig. 1.

Fig. 4 is a partial internal view of the seal of Fig. 1.

An embodiment of the invention is illustrated in Figs. 1 and 2 for blocking fluid flow between an outer rotatable shaft 11 and an inner coaxially rotatable shaft 13 of a conventional "twin spool" jet engine. Outer shaft 11 is adapted to rotate at speeds above 18,000 revolutions per minute, and the inner shaft 13 is adapted to rotate at speeds above 12,000 revolutions per minute. The bearing oil which is force fed by means (not shown) to a bearing (not shown) adjacent space 15 tends to flow longitudinally from space 15 to space 16. Also, air in space 15 is under pressure during operation of the engine and tends to flow between shafts 11 and 13 from space 15 to space 16.

A seal 19, which is illustrated herein as being similar to that described in a copending application Serial No. 447,276 now U.S. Patent No. 2,908,516, that is assigned to the assignee of this invention, counteracts the fluid flow. The annular primary sealing surface 21 of seal 19 conforms with and bears against cylindrical surface 22 of shaft 13 as the shaft rotates, thus to prevent leakage between the seal and shaft 13. Since the diameter of shaft 13 may change due to expansion and contraction caused by temperature variations, the seal has a plurality of first inner segments 23, advantageously six in number, assembled in end to end relation with gaps 25 and $25_1$ (Fig. 4) between the segment ends. Thus, the seal may increase or decrease in diameter to accommodate the change in shaft diameter. Overlapping portions 27 and $27_1$ of seal 19 block leakage through a portion of the joints 28. A plurality of second cover segments 29, advantageously the same in number as the number of segments 23, contact the outside diameter of segments 23 across gaps 25 and $25_1$, additionally to block leakage through joints 28, and to provide with segments 23 a secondary sealing surface 30 adapted to contact side 31 of seal (holder) case 33 to block fluid flow between the seal and the seal case along the secondary sealing surface. Nut 34 threaded on shaft 11 holds seal case 33 against shoulder 35 so that the case rotates with shaft 11 and means to be described in more detail hereinafter cause the seal to rotate with the case. A conventional neoprene O-ring 36 located in groove 37 in the outside of the case prevents leakage between the case and shaft 11.

It has been conventional practice to place a circumferential extension spring under tension in a groove around the outside diameter of seal 19 to hold the segments thereof assembled in conformable contact with shaft 13, in order to maintain the mentioned sealing contact of seal 19 with shaft 13. Small compressed extension springs extending parallel to the axis of the shafts between side 41 of case 33 and side 43 of seal 19 maintained contact between the seal and side 31 of case 33. Typically, a very light spring force holds the seal in sealing contact with the shaft to minimize the friction between the seal and the shaft. Also, a light spring force holds the seal against the seal case so that the seal can move radially to accommodate radial movement of the shaft caused by bearing play and the like. It will be understood that if the seal did not move radially with the eccentric movements of shaft 13, there would be great wear on the seal bore. As shown in Fig. 2, there is a sufficient clearance between the seal case and shaft 13 to allow for eccentric movement of shaft 13.

A seal, as so far described, will prevent leakage between shafts 11 and 13 from space 15 to space 16 and insure a required high pressure in space 15 relative to space 16 and a pressure drop across the seal. This pressure drop across the seal will seat the primary and secondary surfaces of seal 19 against shaft 13 and case 33 respectively, as is well known in the art. Because large pressure differentials can cause a large load on seal 19 that will cause high temperature from friction between the primary sealing surface 21 (bore) and shaft 13, when the latter rotates, which can be destructive to the shaft and the seal, the primary and secondary sealing surfaces of the seal may have pressure balancing grooves 45 and $45_1$ such as described in copending application Serial No. 447,276 now U.S. Patent No. 2,908,516. These pressure balancing grooves reduce the load or unbalance on the seal caused by the pressure differential and make possible fluid flow blocking by terminating in small adjacent sealing dams 46 and 47, advantageously about .020 inch wide, which meet at right angles adjacent the seal case so that dam 47 contacts side 31 of the seal case and the other dam 46 contacts shaft 13. Thus with low pressure or high pressure and pressure balancing grooves the tendency of the pressure to seat the seal against shaft 13 and case 33 is small.

Since the forces tending to hold the primary and secondary sealing surfaces in contact with shaft 13 and case 33 are relatively small, rotation of seal 19 produces centrifugal force which can expand seal 19 outwardly away from shaft 13 thus to break the sealing contact between seal 19 and shaft 13.

In accordance with this invention, the seal is loaded in such a way that the seal remains in contact with the one shaft regardless of the rate of rotation of the shaft, yet the friction that is caused by the contact between the seal and the shaft is minimized.

In accordance with the embodiment of the invention illustrated in Fig. 2, levers 51 are arranged around seal 19 with an internal circumferential expanding extension spring 52 arranged in ends 53 of the levers so that ends 54 of the levers exert a force against seal 19. To minimize the friction between seal 19 and shaft 13, the spring force exerted by the spring against the levers is small and provides a low loading on seal 19. As is well known in the art, the spring force can be calculated to produce the required loading. Continuous annular corrugated "wave washer" 55 (Figs. 2 and 3) seated in groove 57 of case 33 and interposed between side 43 of seal 19 and side 41 of case 33 maintains contact between the secondary surface 30 of seal 19 and side 31 of seal case 33. The force exerted by the "wave washer" to hold the seal in contact with the case is small.

Advantageously, there are three times as many lever arms as second segments 29 but this number can be varied, for example, depending upon the number of second segments used. The levers, which may be part of cover 59 of case 33, pivot around fulcrum post 60. Pins 61 running through cover 59 into seal case 33 position and hold the cover and fulcrums. Noncontinuous flat split ring 63 also holds cover 59 in place. Pins 65 permit the levers to pivot around the fulcrums and provide a lever fulcrum assembly 67 which rotates with case 33 and shaft 11. Advantageously, two levers exert a force directly against each second segment 29 and one lever exerts a force against each first segment 23 by means of a shoe 69 (Fig. 1) pivotable on the end of the lever by means of pins 71. To this end, the shoes fit between the adjacent ends of segments 29 and into grooves 73 in the outside diameter of segments 23 and this causes seal 19 to rotate with the lever assembly and shaft 11.

Levers 51 are made so that the total mass of a first portion 84 comprised of seal 19, levers 51 from ends 54 to the fulcrum pins 65 and shoes 69 are equal to the total mass of a second portion 86 comprised of the remaining portion of the levers from the fulcrum to ends 53 and spring 52.

The rotation of shaft 11 creates a first centrifugal force proportional to the speed of shaft 13 which tends to throw first portion 84 radially outwardly away from shaft 13 at right angles to the axis of shaft 11 and a second centrifugal force proportional to the speed of shaft 13 in second portion 86 at right angles to the axis of shaft 13 which tends to throw the second portion outwardly in such a way that the first centrifugal force is completely balanced by a third force which is opposite and equal to the first force. Thus, regardless of the speed of shaft 11, the force exerted by spring 52 to hold seal 19 against shaft 13 is sufficient to maintain contact between the seal and the shaft and yet is small enough so that the friction between the shaft and the seal is minimized.

In operation, spring 52 and "wave washer" 55 hold primary and secondary sealing surfaces 21 and 30 of seal 19 in sealing contact with shaft 13 and seal case 33 so as to prevent leakage between shafts 11 and 13 from chamber 15 to chamber 16. The force produced by spring 52 against the seal is small so that friction between the seal and the shaft is minimized and the force exerted by "wave washer" 55 is small enough so that seal 19 may move axially along side 31 of case 33. When shaft 11 rotates friction is caused between the shaft and the seal along the primary sealing surface 21 of the seal. When the shaft 13 moves radially due to clearance in the bearings, seal 19 moves radially with the shaft while the primary sealing surface conforms to the shaft and the secondary sealing surface conforms to the side 31 of the seal case. Normally, when shaft 11 rotates at a given speed shaft 13 rotates at a different speed and thus seal 19, which rotates with the shaft 11, produces friction between the seal bore and shaft 13. As shaft 11 rotates at increasing angular velocities, centrifugal force is produced in the seal which tends to throw the seal radially outwardly so as to break the sealing contact between the seal and shaft 13. However, rotation of shaft 11 also causes a centrifugal force in end 53 of levers 51 which tends to cause ends 54 of the levers to push seal 19 radially inward in opposition to the centrifugal force created in the seal. As described above, the lever is made so that the centrifugal force which tends to cause the seal to be thrown radially outwardly is effectively balanced by the effects of centrifugal force in the levers, whereby spring 52 maintains contact between seal 19 and shaft 13 no matter what the speed of shaft 13.

This invention has the advantage that a circumferential shaft seal is provided which is rotatable with an outer shaft and in rubbing contact with an inner shaft and in which means is provided for maintaining sealing contact between the seal and the inner shaft no matter what the speed of the outer shaft and while maintaining a minimum of friction between the seal and the inner shaft.

What is claimed is:

1. In a shaft sealing structure for forming a seal in an annular space between the inner and outer peripheries, respectively, of a cylindrical shaft and a coaxial central shaft rotatable relative to each other including a segmental sealing ring disposed in said annular space having a primary sealing surface engaging the periphery of said central shaft, an upstanding wall normal to the said axis of said shafts and rotatable with said cylindrical shaft, said sealing ring having a side surface engageable with said upstanding member to form a secondary sealing surface, and means operatively connecting said sealing ring with said upstanding member for rotation therewith and thereby said second shaft; the improvement comprising means rotatable with said cylindrical shaft engaging said sealing ring for retaining the latter in primary sealing engagement with said first shaft upon rotation of said second shaft creating a centrifugal force tending to break said primary sealing engagement including a plurality of levers, means mounted for rotation with said shaft pivotably mounting each of said levers so that each of said levers includes, a first moment arm engaging said sealing ring and a second moment arm on the other side of said pivot means being operative upon rotation of said cylindrical shaft to cause said lever to pivot so that said first moment arm exerts a force substantially equal and opposite to the centrifugal force created on said sealing ring whereby said sealing ring is retained in primary sealing engagement.

2. In a shaft sealing structure for forming a seal in an annular space between the inner and outer peripheries, respectively, of a cylindrical shaft and a coaxial central shaft rotatable relative to each other including a segmental sealing ring disposed in said annular space having a primary sealing surface engaging the periphery of said central shaft, an upstanding wall normal to the said axis of said shafts and rotatable with said cylindrical shaft, said sealing ring having a side surface engageable with said upstanding member to form a secondary sealing surface, and means operatively connecting said sealing ring with said upstanding member for rotation therewith and thereby said second shaft; the improvement comprising means rotatable with said cylindrical shaft engaging said sealing ring for retaining the latter in primary sealing engagement with said first shaft upon rotation of said second shaft creating a centrifugal force tending to break said primary sealing engagement including a plurality of levers, means mounted for rotation with said shaft pivotably mounting each of said levers so that each of said levers includes, a first moment arm engaging said sealing ring and a second moment arm on the other side of said pivot means, each of said second moment arms of said levers being formed so that the mass thereof is substantially equal to sum of the mass of said first moment arm and said sealing ring so that upon rotation of said cylindrical shaft said lever pivots and said first moment arm exerts a force substantially equal and opposite to the centrifugal force created on said sealing ring whereby said sealing ring is retained in primary sealing engagement.

3. In a shaft sealing structure for forming a seal in an annular space between the inner and outer peripheries, respectively, of a cylindrical shaft and a coaxial central shaft rotatable relative to each other including a segmental sealing ring disposed in said annular space having a primary sealing surface engaging the periphery of said central shaft, an upstanding wall normal to the said axis of said shaft and rotatable with said cylindrical shaft, said sealing ring having a side surface engageable with said upstanding member to form a secondary sealing surface, and means operatively connecting said sealing ring with said upstanding member for rotation therewith and thereby said second shaft; the improvement comprising means rotatable with said cylindrical shaft engaging said sealing ring for retaining the latter in primary sealing engagement with said first shaft upon rotation of said second shaft creating a centrifugal force tending to break said primary sealing engagement including a plurality of levers, means mounted for rotation with said shaft pivotably mounting each of said levers so that each of said levers includes, a first moment arm engaging said sealing ring and a second moment arm on the other side of said pivot means, each of said second moment arms of said levers being formed so that the mass thereof is substantially equal to sum of the mass of said first moment arm and said sealing ring so that upon rotation of said cylindrical shaft said lever pivots and said first moment arm exerts a force substantially equal and opposite to the centrifugal force created on said sealing ring whereby said sealing ring is retained in primary sealing engagement, and spring means engaging each of said second moment arms for urging said first moment arm into engagement with said sealing ring.

4. In a shaft sealing structure for forming a seal in an annular space between the inner and outer peripheries, respectively, of a cylindrical shaft and a coaxial central shaft rotatable relative to each other including a segmental sealing ring disposed in said annular space having a primary sealing surface engaging the periphery of said central shaft and an upstanding wall normal to the said axis of said shafts and rotatable with said cylindrical shaft and engageable with a side surface of said sealing ring to form a secondary sealing surface, and means operatively connecting said sealing ring with said upstanding member for rotation therewith and thereby said second shaft; the improvement comprising means rotatable with said cylindrical shaft engaging said sealing ring for retaining the latter in primary sealing engagement with said first shaft upon rotation of said second shaft creating a centrifugal force tending to break said primary sealing engagement including a plurality of levers, means mounted for rotation with said shaft pivotably mounting each of said levers so that each of said levers includes, a first moment arm engaging said sealing ring and a second moment arm on the other side of said pivot means being operative upon rotation of said cylindrical shaft to cause said lever to pivot so that said first moment arm exerts a force substantially equal and opposite to the centrifugal force created on said sealing ring whereby said sealing ring is retained in primary sealing engagement, and means mounted for limited axially movement and rotatable with said cylindrical shaft having resilient means engaging said sealing ring for holding said sealing ring in secondary sealing engagement.

References Cited in the file of this patent

UNITED STATES PATENTS

| 1,220,901 | States | Mar. 27, 1917 |
| 2,076,747 | Salisbury | Apr. 13, 1937 |
| 2,454,036 | Clayton-Wright | Nov. 16, 1948 |